(12) United States Patent
Van Alstine

(10) Patent No.: US 10,059,020 B2
(45) Date of Patent: *Aug. 28, 2018

(54) BLADE MOUNTING STRUCTURE REQUIRING LESS CURRENT FOR A HEATED CUTTING BLADE

(71) Applicant: Guy A. Van Alstine, Trappe, PA (US)

(72) Inventor: Guy A. Van Alstine, Trappe, PA (US)

( * ) Notice: Subject to any disclaimer, the term of this patent is extended or adjusted under 35 U.S.C. 154(b) by 1080 days.

This patent is subject to a terminal disclaimer.

(21) Appl. No.: 14/037,588

(22) Filed: Sep. 26, 2013

(65) Prior Publication Data

US 2014/0020535 A1    Jan. 23, 2014

Related U.S. Application Data

(62) Division of application No. 12/655,439, filed on Dec. 30, 2009, now Pat. No. 8,650,760.

(51) Int. Cl.
*B26D 3/06* (2006.01)
*B26D 7/10* (2006.01)
(Continued)

(52) U.S. Cl.
CPC .............. *B26D 7/10* (2013.01); *B23D 35/008* (2013.01); *B26B 5/00* (2013.01); *B26D 1/0006* (2013.01);
(Continued)

(58) Field of Classification Search
CPC ...... B23D 35/008; B26B 5/00; B26D 1/0006; B26D 3/003; B26D 3/06; B26D 3/065;
B26D 7/10; B26D 7/2614; B26D 2001/0053; B26F 3/08; B29D 29/06; B29D 30/68; B29D 2030/685; Y10S 83/951;
(Continued)

(56) References Cited

U.S. PATENT DOCUMENTS 1,955,395 A    4/1934   Tueth .............................. 30/140
2,013,234 A    9/1935   Campbell
(Continued)

FOREIGN PATENT DOCUMENTS

DE    296 11 943 U1 * 11/1997 ............. B29D 30/68
EP    0 317 751        5/1989 ...................... 83/171
(Continued)

*Primary Examiner* — Clark F Dexter
(74) *Attorney, Agent, or Firm* — Joseph E. Maenner; Petock and Petock, LLC

(57) ABSTRACT

The present invention provides a method and apparatus of reducing current requirements by increasing resistance of the blade structure by reducing the cross sectional area of at least one section of the blade so that the electrical current requirements for heating of the blade to cutting temperature are reduced wherein the power supply and substantially entire unit may be mounted within a hand held unit. Methods of shaping blades to perform various heat distributions for specialty blades for custom cutting are disclosed. Further, an improved blade mounting structure is provided which includes structure for maintaining the legs of the blade parallel to the direction of cut and provides for easy insertion of new blades by maintaining a slotted blade cradle stable and in alignment with the blades and a clamp member away from the blade when the clamp mounting structure is loosened.

38 Claims, 10 Drawing Sheets

(51) Int. Cl.
*B26F 3/08* (2006.01)
*B29D 29/06* (2006.01)
*B29D 30/68* (2006.01)
*B23D 35/00* (2006.01)
*B26B 5/00* (2006.01)
*B26D 1/00* (2006.01)
*B26D 3/00* (2006.01)
*B26D 7/26* (2006.01)

(52) U.S. Cl.
CPC ............... *B26D 3/003* (2013.01); *B26D 3/06* (2013.01); *B26D 7/2614* (2013.01); *B26F 3/08* (2013.01); *B29D 29/06* (2013.01); *B29D 30/68* (2013.01); *B26D 2001/0053* (2013.01); *Y10S 83/951* (2013.01); *Y10T 83/0304* (2015.04); *Y10T 83/04* (2015.04); *Y10T 83/293* (2015.04); *Y10T 83/949* (2015.04); *Y10T 83/9457* (2015.04); *Y10T 83/9461* (2015.04); *Y10T 83/9488* (2015.04)

(58) Field of Classification Search
CPC . Y10T 83/0304; Y10T 83/283; Y10T 83/293; Y10T 83/9457; Y10T 83/9461; Y10T 83/9488; Y10T 83/949; Y10T 83/9493; Y10T 83/9495; Y10T 83/9498
USPC ........ 83/170, 171, 699.51, 699.61, 856–858, 83/875, 951, 698.11, 698.31; 30/140, 30/280, 286, 289, 293, 294, 304, 329, 30/332, 333; 157/13; 219/229, 230, 219/233–240, 533, 552
See application file for complete search history.

(56) References Cited

U.S. PATENT DOCUMENTS

| | | | |
|---|---|---|---|
| 2,063,894 A | 12/1936 | Jack et al. | |
| 2,097,811 A | 11/1937 | Foley | |
| 2,140,478 A | 12/1938 | Mossback | 30/140 |
| 2,222,036 A | 11/1940 | Koppin et al. | |
| 2,230,042 A | 1/1941 | Mertens, Jr. | 30/280 |
| 2,240,382 A | 4/1941 | Van Alstine | |
| 2,618,056 A | 11/1952 | Van Alstine | |
| 2,896,059 A | 7/1959 | Ruff | |
| 2,986,204 A | 5/1961 | Wilson et al. | |
| 3,693,253 A | 9/1972 | Jager et al. | 30/140 |
| 3,992,605 A | 11/1976 | Kraus et al. | 219/233 |
| 4,000,395 A | 12/1976 | Fischer | 219/221 |
| 4,081,017 A | 3/1978 | Appleby et al. | 157/13 |
| 4,147,196 A | 4/1979 | Jarry | 157/13 |
| 4,367,396 A | 1/1983 | Ravinsky | 219/233 |
| 4,539,467 A | 9/1985 | Wenger | 219/233 |
| 4,665,915 A | 5/1987 | Grollimund | 128/305.5 |
| 4,797,999 A | 1/1989 | Van Alstine | 30/140 |
| 5,065,804 A | 11/1991 | Kinuhata et al. | 157/13 |
| 5,073,696 A | 12/1991 | Patillo et al. | 219/233 |
| 5,104,744 A | 4/1992 | Haas | 428/596 |
| 5,179,782 A | 1/1993 | Van Alstine | 30/140 |
| 5,247,983 A | 9/1993 | Inez | 157/13 |
| 5,490,330 A | 2/1996 | Van Alstine | 30/140 |
| 6,230,603 B1 | 5/2001 | Kubala | 83/875 |

FOREIGN PATENT DOCUMENTS

| | | | |
|---|---|---|---|
| EP | 0 321 910 | 6/1989 | 83/171 |
| GB | 813309 | * 5/1959 | B29D 30/68 |
| JP | 2004-074387 | 3/2004 | |

* cited by examiner

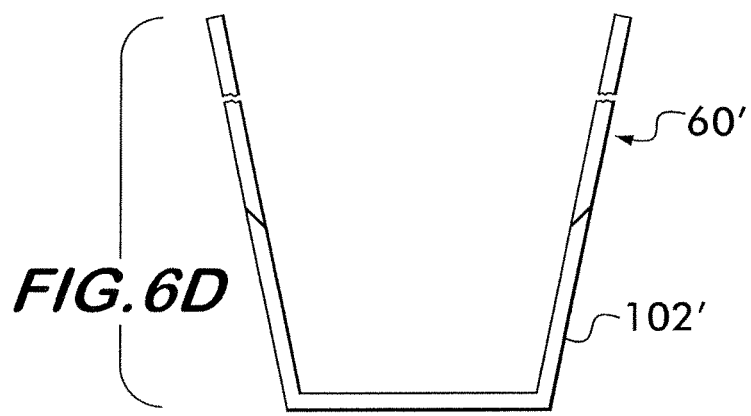
FIG.6D
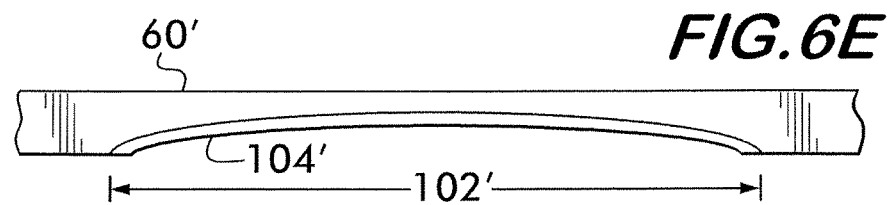
FIG.6E
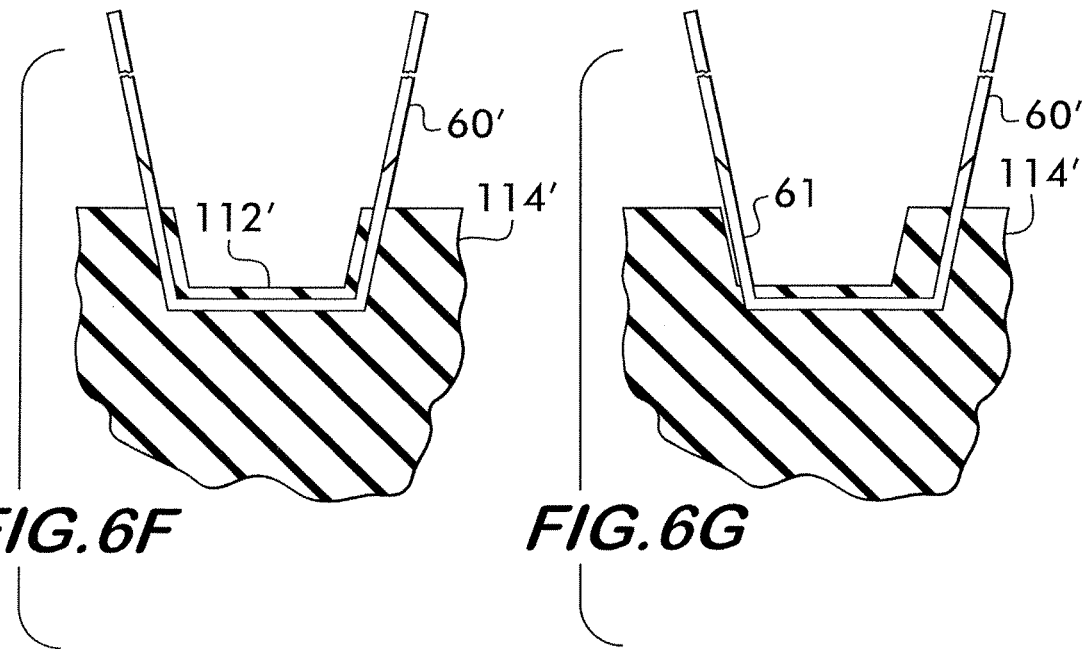
FIG.6F  FIG.6G

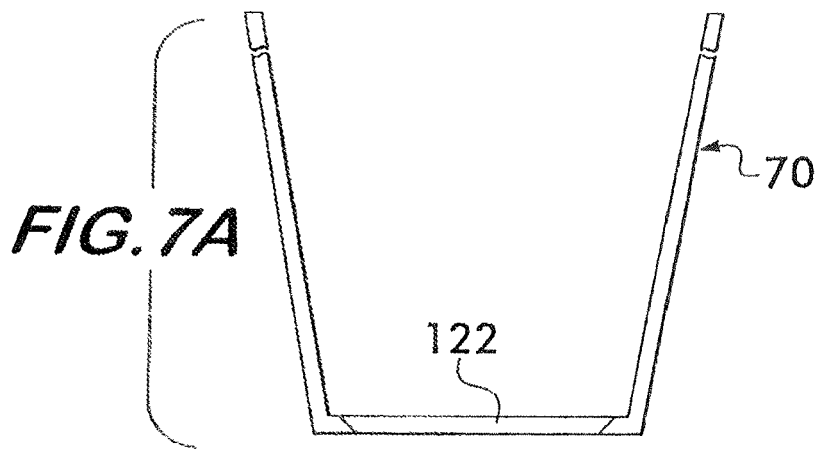
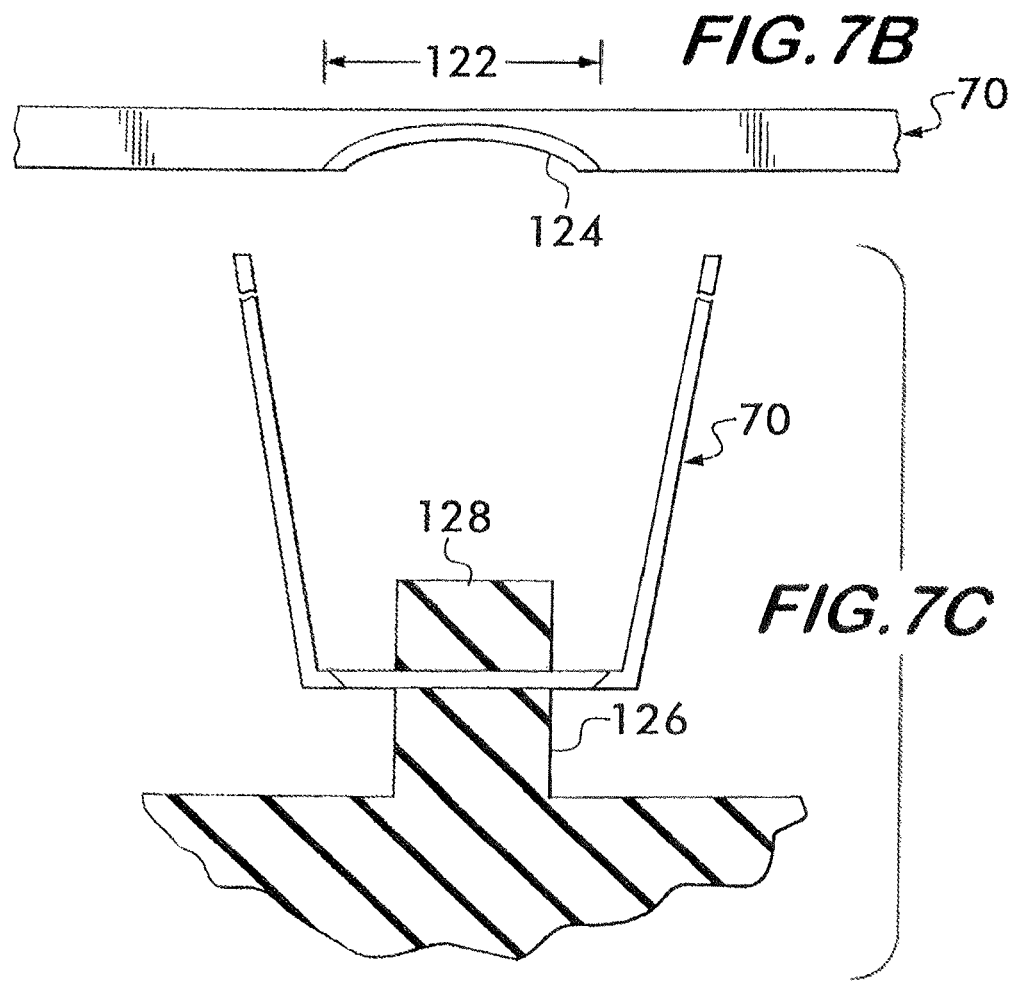

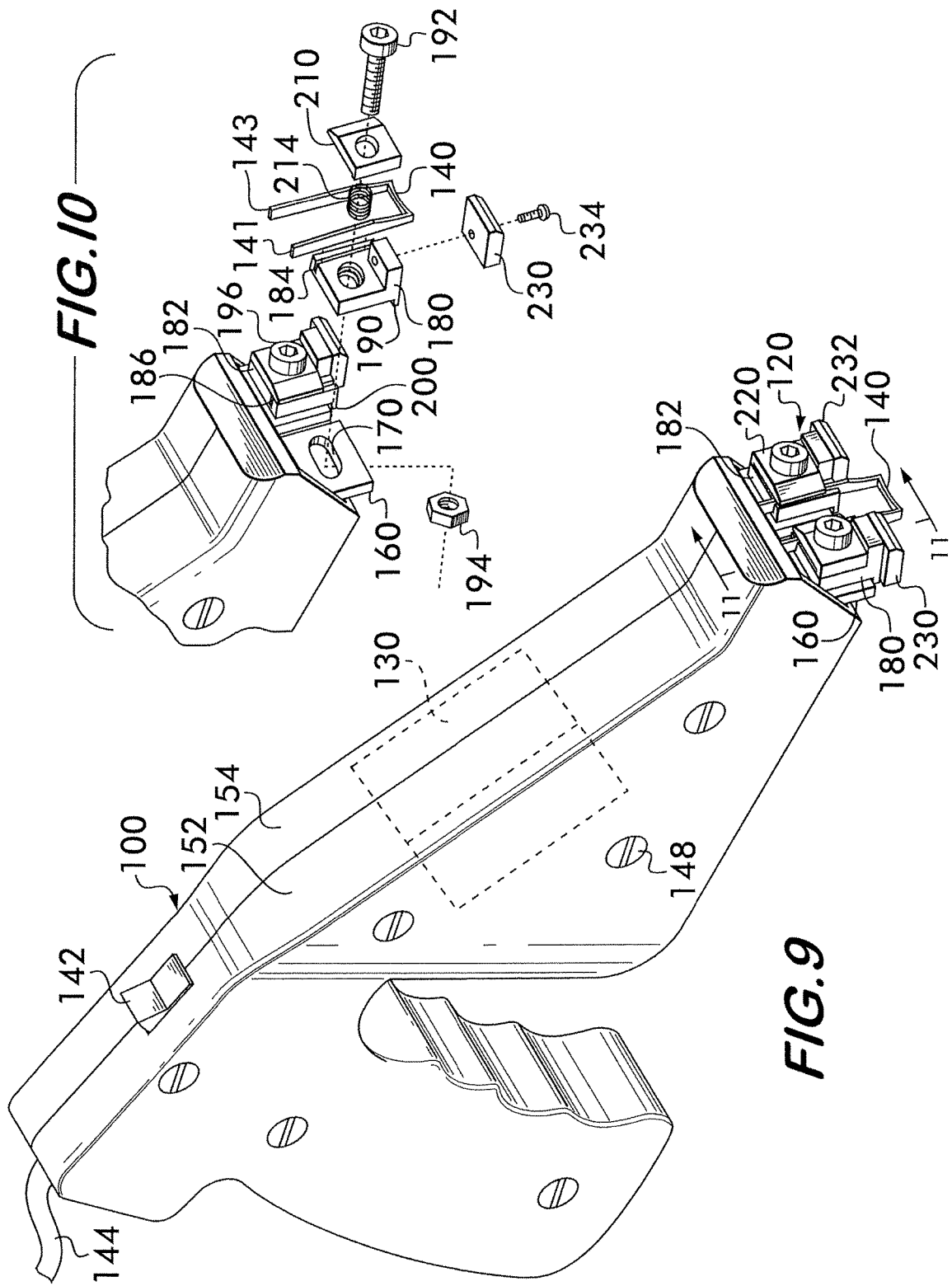

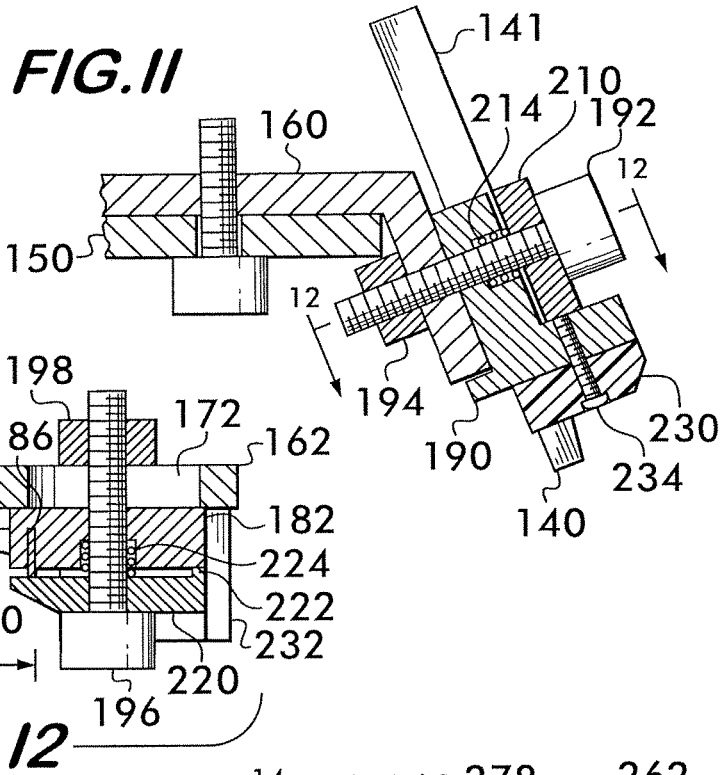
FIG.11
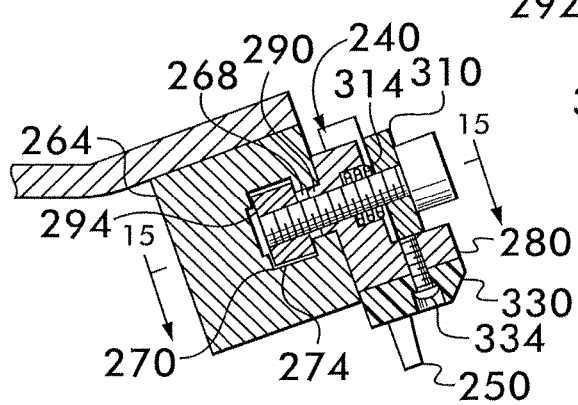
FIG.12
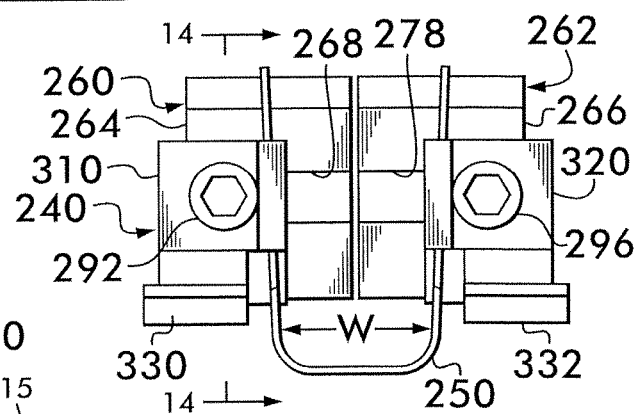
FIG.13
FIG.14

BLADE MOUNTING STRUCTURE REQUIRING LESS CURRENT FOR A HEATED CUTTING BLADE

CROSS REFERENCE TO RELATED APPLICATION(S)

This is a divisional application which claims the benefit of the filing date of application Ser. No. 12/655,439 filed Dec. 30, 2009 entitled Heated Cutting Blade, Cutting Head, and Blade Mounting Structure Requiring Less Current and Providing Improved Cutting and Method by the inventor herein. Applicant claims the benefit of the filing date of the aforesaid application and incorporates by reference the aforesaid application.

FIELD OF THE INVENTION

The present invention relates to field of cutting heat sensitive material using a blade which is heated by the passage of current through the resistance of the blade. Particularly, a new and improved resistance heated cutting blade, cutting head and blade mounting structure which require less current and provide improved cutting are disclosed along with the method of producing these effects. More particularly, in accordance with the present invention a blade for cutting a heat sensitive material which is heated by the passage of current through the resistance of the blade is provided with selected sections of reduced cross sectional area to reduce the amount of current flow required through the blade to achieve a predetermined amount of heating and to control the area or areas of heating of the blade. The reduction in the amount of current flow required by the blade enables the use of a smaller and lighter transformer and power supply which enables the entire tool (cutting head and power supply) to be substantially mounted within the handheld unit with a stabilizer structure which enables more uniform control of depth of cut and general ease of control. The invention further includes a blade mounting structure in which the blade remains parallel to the cutting direction, provides better mechanical support of the blade and maximizes the electrical surface contact with the blade, as well as ease of insertion of the blade and other advantages.

BACKGROUND OF THE INVENTION

Summary of the Invention

An advantage of the present invention is that it provides resistance heated cutting blades which require less current enabling the use of a smaller transformer and smaller power supply further enabling the entire cutting instrument to be incorporated into a handheld unit.

Another advantage of the present invention is that it provides a means of controlling where the heat will be supplied in the blade. This enables the heat to be controlled so that the heat is supplied to the portion of the blade which is in the heat sensitive material, such as rubber. Without the present invention, heat may be concentrated in portions of the blade which are outside of the heat sensitive material causing that portion of the blade to overheat.

Another advantage of the present invention is that it provides a means for quickly and easily mounting resistance heated electrical blades where the blades are aligned with the direction of cutting.

Briefly and basically in accordance with the present invention, a method of cutting a heat sensitive material using an electrically heated cutting blade includes the steps of shaping the blade to substantially reduce the cross-sectional area of the blade in a section of the blade between a first end and a second end of the blade to increase electrical resistance and heating of the blade section when an electrical current is passed through the blade thereby reducing the amount of current required to heat the section to a predetermined temperature. The blade may be reduced in cross-sectional area by more than 50% at a resistance point in the section. However, in certain situations, a reduction of thirty percent of the cross sectional area of the blade at the resistance point may be sufficient. The reduced cross sectional area may be achieved by reduction in width and or thickness of the blade. Also, the sharpening of the blade causes some reduction in the cross sectional area of the blade. The blade may be substantially U-shaped, L-shaped, in a single plane or any other suitable shape. The blade may have more than one section of reduced cross-sectional area. The sections of reduced cross-sectional area may be arranged to provide heating in desired sections of the blade and reduction of heating in other sections of the blade.

The present invention further comprises a blade for cutting heat sensitive material which comprises a conductive or steel blade having a first and second end and the blade between the first and second ends having a section of reduced cross-sectional area producing increased electrical resistance and heating when an electrical current is passed therethrough. Steel is defined herein to mean any metal which contains iron and carbon including but not limited to stainless steel and may include various other metals such as vanadium, chromium, nickel or various other metals or alloys thereof. The reduced cross-sectional area of the blade is provided with a sharpened edge. The section of reduced cross-sectional area is at least at one point reduced in cross-section by greater than 50% compared to the cross-sectional area of the remainder of the unshaped blade. The section of reduced cross-sectional area producing increased resistance may be provided with a resistance lead on each side in the form of a taper of the blade. The taper may be linear, non-linear, multiple non-linear sub sections or multiple linear sub sections of differing rates of linear taper. It is understood that non linear taper and differing rates of taper include the case where the taper occurs in the distance approaching zero and is effectively discontinuous or effectively changes from full cross sectional area to maximum reduced cross sectional area in substantially zero distance. The blade may be provided with a plurality of sections of reduced cross-sectional area in series in the blade. The section of reduced cross-sectional area may be centrally located between the first and the second ends of the blade or may be located closer to one end. The blade may be substantially U-shaped, L-shaped or substantially within a single plane (flat).

Further, briefly and basically in accordance with the present invention an apparatus is provided for making a groove in a heat sensitive material which comprises a substantially U-shaped blade, a handheld unit for holding the substantially U-shaped blade with the substantially U-shaped blade having at least one section of reduced cross-sectional area to increase its electrical resistance, and a power supply for providing electrical current to the substantially U-shaped blade with the power supply being mounted in the handheld unit.

Further, the handheld unit may be provided with a blade mounting structure. The blade mounting structure includes a lower surface below which the blade extends. A stabilizer structure is formed at a lower end of the blade mounting structure. The stabilizer structure may be formed as an enlarged part of the lower blade mounting structure or it may be a separate low friction heat insulated material mounted to the bottom of the blade mounting structure.

Briefly and basically, the invention further includes a blade mounting structure for an electrical resistance heated substantially U-shaped blade which includes a first electrical contact and a second electrical contact electrically insulated from each other for providing electrical current and structure mounted to each contact for mounting a leg of the substantially U-shaped blade. The structure mounted to each contact includes a cradle bracket mounted to the contact, a slotted blade cradle mounted to the cradle bracket and latterly adjustable so that blades of differing width may have a leg of the blade inserted into the slot. The blade cradle may be provided with a lip or guide which engages the cradle bracket to prevent rotation or twisting of the slotted blade cradle with respect to the cradle bracket. A clamp member formed of a shape to extend over at least a portion the slot and any blade in the slot is provided with a lip which tends to prevent the clamp from tilting, rotating or twisting. Means for tightening the clamp member against the blade in the slot and against a resilient means forcing the clamp member away from the cradle bracket are provided. The resilient means also holds the blade cradle still or immobilized for the insertion of a new blade. A stabilizer structure is provided on a lower portion of the slotted blade cradle. The stabilizer structure may be formed as a part of the lower end of the slotted blade cradle by a raised portion extending to the outside of the blade and in front of the blade. Alternatively, the stabilizer structure may be formed of a low friction material, such as polytetrafluoroethylene, mounted to a lower portion of the slotted blade cradle outside of the blade and in front of the blade.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 6D is an elevation view of another embodiment of a U-shaped blade having a section of reduced cross sectional area which is commonly used in regrooving operations.

FIG. 6E is a plan view, partially broken away, of the blade of FIG. 6D before being bent.

FIG. 6F is a cross sectional view illustrating the blade as shown in FIG. 6D being utilized in a regrooving process in a heat sensitive material, such as rubber of a tire, where the blade is perfectly centered on the previous groove.

FIG. 6G is a cross sectional view illustrating the blade as shown in FIG. 6D being utilized in a regrooving operation in a heat sensitive material, such as rubber of a tire, where the operator has temporarily deviated from holding the cutting blade perfectly centered on the previous groove.

FIG. 7A is an elevation view of another embodiment of a blade in accordance with the present invention.

FIG. 7B is a plan view, partially broken away, of the blade of FIG. 7A before bending showing a sharpened section of reduced cross sectional area.

FIG. 7C is a cross sectional view illustrating the blade of FIG. 7A being utilized to cut a rib or projecting peninsula of heat sensitive material.

FIG. 9 is a view in perspective of a hand held unit and blade mounting structure for use of blades in accordance with the present invention.

FIG. 10 is an exploded view, partially broken away, in perspective of a blade mounting structure in accordance with the present invention.

FIG. 11 is a cross sectional view taken along line 11-11 of FIG. 9.

FIG. 12 is a cross sectional view taken along line 12-12 of FIG. 11.

FIG. 13 is a front elevation view of a presently preferred alternate embodiment of the blade mounting structure of the present invention.

FIG. 14 is a cross sectional view taken along line 14-14 of FIG. 13.

DETAILED DESCRIPTION OF THE PREFERRED EMBODIMENTS

Figure 1:
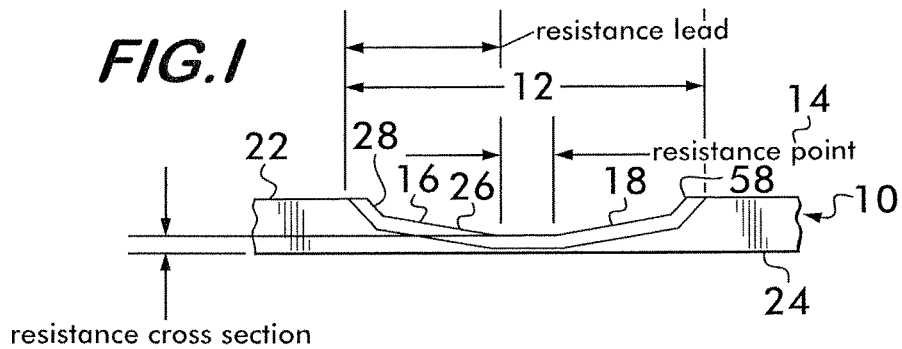
FIG. 1 is a plan view, partially broken away, of a blade before possible bending in accordance with the present invention containing a sharpened section of reduced cross sectional area comprised of a resistance point and resistance leads of multiple linear tapers.

Referring now to the drawings, wherein like numerals indicate like elements, there is shown in FIG. 1 a blade 10 in accordance with the present invention for cutting heat sensitive materials, such as rubber, plastic or other heat sensitive materials, which requires a smaller current to heat the resistance point to a predetermined temperature suitable for cutting the heat sensitive material. Blade 10 is shaped to substantially reduce the cross sectional area of the blade in a section 12 extending as illustrated in FIG. 1 and including resistance point 14 and resistance lead taper sections 16 and 18. Section 12 has a substantially reduced cross sectional area as compared to the end portions of the blade, such as first end 22 and second end 24. "End or end portion of the blade" does not necessarily mean the very end of the blade, but portions of the blade where the cross sectional area is not reduced, not sharpened and is used for attachment to the mounting structure of a cutting head. The cross sectional area of the blade is most reduced in the resistance point which as shown in FIG. 1 and labeled resistance cross section, is substantially reduced and reduced by more than fifty percent of the normal cross section of the blade. The blades are generally of uniform thickness and accordingly reduction in the width as indicated in FIG. 1 to produce the resistance cross section reduces the cross sectional area by more than fifty percent. The reduction in the resistance point of the cross sectional area increases the electrical resistance in the resistance point and increases the heating of the blade in the resistance point for a fixed current flow through the blade since the heating is a result of $I^2R$ heating or electrical resistance heating. Accordingly, by reducing the cross sectional area in the resistance point which is in electrical series in the blade thereby reduces the amount of current required to heat the section to a predetermined temperature. As disclosed above, the cross sectional area of the blade may be reduced by shaping or reductions in dimensions of the width and/or the thickness of the blade. Sharpening of the blade also reduces the cross sectional area somewhat. The foregoing applies for all embodiments disclosed herein.

As illustrated in FIG. 1, section 12 is preferably sharpened as illustrated at 58. The blades may be sharpened in any form of suitable sharpening including single sharpening bevel as illustrated, double bevel blade sharpening and any other suitable sharpening form. In section 12 of reduced cross sectional area, the resistance point 14 is provided with resistance leads 16 and 18 in the form of tapers. Each taper 16 and 18 is provided with two linear tapers of differing taper rates, as illustrated for taper 16 at 26 and 28.

Unlike conventional blades, the blade 10 is not sharpened along its entire length, but only in the section of reduced cross sectional area, which becomes the cutting area in the heat sensitive material. This provides additional strength and better structure for attachment to the blade mounting structure of the cutting unit.

The present invention, which utilizes a blade with a cutting edge that does not run the full length of the blade, provides both an element of safety in handling for both the manufacturer and the user of the blades. Furthermore, the unsharpened edge end portions of the blade mate better with the blade holding mechanism. The design of blades having a continuous cutting edge from end to end dates back to a time when regroover blades were heated by making contact with an already heated holding block. That was an inefficient process of heating the blade. The introduction of electrical resistance heating, provides for more continuous and controllable heating of the blade, but unfortunately requires a large electrical power supply which is both large and heavy. Most regrooving equipment requires a control box or power supply that weigh approximately eight pounds. A heavy cable made of 8 gauge wire or larger connects the control box or power supply enclosure to the handle or cutting end of the tool. The length of this heavy power cable is limited and its weight and lack of flexibility hinder maneuverability during the grooving process. This cable with a large current running through it can become uncomfortably warm during use. The use of the blades of the present invention with a resistance point which has a reduced cross sectional area of less than fifty percent of the cross sectional area of the end portions enables reduction of size and weight of the power supply to just a fraction of what was previously needed.

The present invention provides means to reduce the current requirements and to control where in the blade the heat is concentrated. This reduces overheating and underheating problems that are common in the industry and provides the ability to make blades that can cut larger cross sections with less effort. Furthermore, the blade of the present invention eliminates the need for a separate stand-alone control box or power supply with the heavy cable connected from the control box to the cutting head. The blades of the present invention enable the power supply size and weight to be reduced so dramatically that the hand held unit with the power supply included is virtually the same weight as the handle or cutting head of the prior art with a separate control box, and the disadvantages of the heavy cable are eliminated.

A key advantage of the present invention is the ability to greatly increase the electrical resistance of the grooving blade by shaping the blade so that it satisfies its mechanical requirements but greatly reduces the current necessary to heat the blade. By use of the shaped blades of the present invention, the cross section at the narrowest part of the blade or resistance point can be reduced to fifty percent and lower of that of a conventional design and in turn the electrical resistance of the blade has been dramatically increased.

Figure 2:
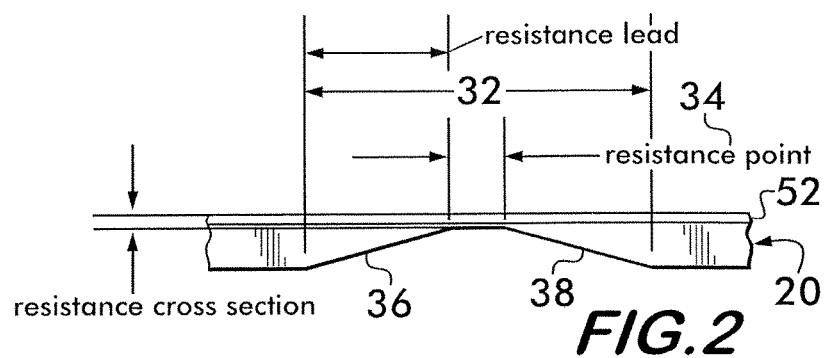
FIG. 2 is a plan view, partially broken away, of another embodiment of a blade before possible bending in accordance with the present invention comprising a sharpened section of reduced cross sectional area comprised of a resistance point and resistance leads.
Figure 3:
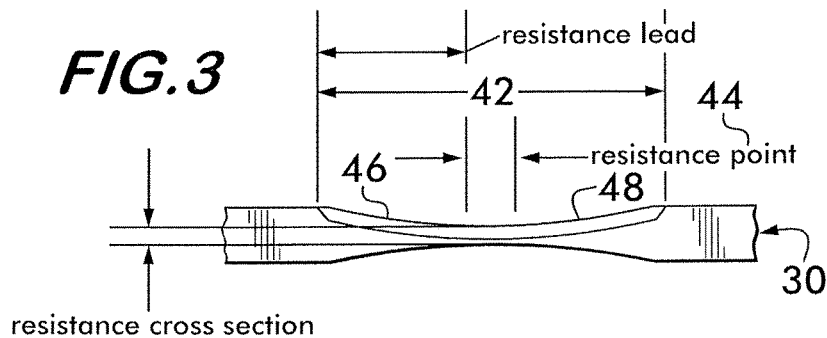
FIG. 3 is a plan view, partially broken away, of another embodiment of a blade before possible bending in accordance with the present invention comprising a sharpened section of reduced cross sectional area comprised of a resistance point and non-linear taper resistance leads, with concavity on both the leading and trailing edges of the blade.

It is important to note that the narrowest section or resistance point of the blade is only functional, mechanically and electrically, when combined with the overall shape of the blade, various examples of which are shown in FIGS. 1, 2 and 3. As seen in these figures, the smallest cross-section in the section of reduced cross-sectional area of the blade, referred to as the resistance point, determines the electrical resistance of the blade. A conventional blade made from stock as narrow as this cross section would never hold up to the stresses of grooving or otherwise cutting heat sensitive material. However, when taken as part of the blade in accordance with the present invention, mechanical properties are enhanced by the shape. A further advantage of the present invention is that the smallest cross section or resistance point of the blade requires less force to move through the heat sensitive material and thereby actually reduces the stress on the blade. The resistance point of the blade controls where the heat will be concentrated most and the configuration of the resistance lead helps to regulate the heat throughout the cutting portion of the blade. That is, in the taper portions of the resistance lead, the resistance and heating are inversely proportional to the cross sectional area of the blade at any point. The cross sectional area of the blade at the narrowest point or resistance point has been reduced to less than fifty percent of the cross sectional area of an unshaped blade. Correspondently, the electrical current needed to heat the blade has been tremendously reduced.

Overheating of the blade is a common problem with prior art designs, as noted in the Wenger patent, supra, wherein a cooling air supply was provided to blow cooling air on a portion of the blade. Any portion of the blade that becomes exposed will instantly overheat and potentially burn through. Blade exposure often occurs between points where the blade exits the tool and the top surface of the heat sensitive material or rubber being cut. Blade exposure is also a common problem when recutting an existing groove. In this case the sides of the U-shaped blade will cut in and out of the rubber as the existing groove is being followed as more fully discussed below with respect to FIGS. 6D, 6E, 6F and 6G. Overheating of the blade causes the blade to lose temper. As a result the strength of the blade is compromised and the blade loses its ability to hold a cutting edge. A dulling blade further slows the cutting process and results in more overheating. Because additional pressure is now needed to cut with an overheated blade the conventional blade will often bend back and sometime snap. The present invention substantially reduces or eliminates the overheating problem with maximum heating being directed to the resistance point. The prior art design blades did not seek to shape the blade to control the resistance at various points in the blade and thereby control the amount of current required to heat the resistance point of the blade and to control where the heating took place. In the prior art, the blades were not shaped to control the electrical resistance of portions of the blade and to reduce the overall current requirements to enable placing of the power supply in the hand held cutting unit. With the present invention, there is a difference in the cross sectional area between the resistance point on the blade and the remainder of the blade, and this enables the remainder of the blade to carry the required current to heat the resistance point of the blade to a predetermined temperature without overheating other portions of the blade which may be exposed, that is not involved within the material being cut. The present invention greatly reduces the electrical current required to heat a particular blade. This results in a power supply that may be only ten to twenty percent of the size of what was required in the prior art. It virtually eliminates an overheating problem that has plagued the industry. Further, the present invention reduces the force required to move the blade through the heat sensitive material. Still further, a much greater electrical resistance can be achieved, even with wider blade stock. This strengthens the sides or legs of the blades especially relative to the reduced force now needed to cut.

Referring now more specifically to FIG. 2, blade 20 is provided with a section of reduced cross sectional area 32 having a resistance point for minimum cross sectional area 34. One each side of resistance point 34 are resistance leads 36 and 38 comprised of linear taper sections. FIG. 2 illustrates an embodiment of the blade of the present invention wherein a sharpened edge 52 is provided on the edge of blade 20 opposite tapers 36 and 38 as contrasted to FIG. 1 wherein the sharpened edge 58 was on the tapered portions, as well as resistance point.

FIG. 3 illustrates a blade 30 having a section 42 of reduced cross sectional area comprised of a resistance point 44 and resistance leads 46 and 48 comprised of non linear tapered sections, specifically concave non linear tapered sections 46 and 48. Blade 30 shows tapered sections on both the sharpened or front side of the blade and a non linear concave reduced cross sectional area section on the back edge of blade 30. In other words, the reduction cross sectional area may be caused in part by tapered portions or concave portions on both the leading edge and trailing edge of the blade.

The foregoing designs discussed with respect to FIGS. 1, 2 and 3 are preferably best suited for applications in the grooving or regrooving of tires or other materials such as belts where the grooves are sized approximately one half inch by one half inch and smaller.

When cutting large grooves in rubber or other heat sensitive material, that is grooves of over three quarters of an inch by three quarters of an inch, the sides of the U-shaped blade do not carry enough heat to sufficiently aid in the cutting process. Resistance heating tends to heat the middle portion of the blade. When a blade is long enough the sides or legs of the blade will lie beyond the heated middle portion. Because the sides are so cool, cutting a large groove can be very difficult. By applying the concepts of the present invention to large blades, multiple resistance points may be created to more evenly heat the blade and at the same time reduce the electrical current needed.

Figure 4:
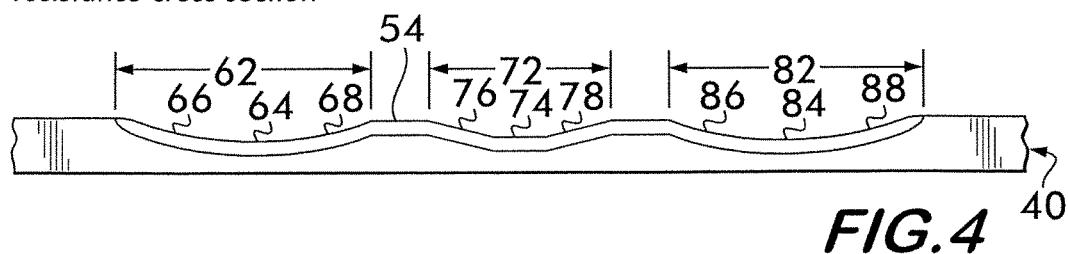
FIG. 4 is a plan view, partially broken away, of another embodiment of a blade in accordance with the present invention having multiple sharpened sections of reduced cross sectional area.

Referring now to FIG. 4, there is shown a preferred embodiment of the present invention wherein the blade may preferably be used to cut larger grooves, that is grooves three quarters of an inch by three quarters of an inch and greater. FIG. 4 is a plan view of a blade before it is bent. Blade 40 may be provided with sections 62, 72 and 82 of reduced cross sectional area. Blade 40 is provided with resistance points 64, 74 and 84. Resistance point 64 is bounded on the two sides by resistance leads 66 and 68 comprised of non linear tapers, which are concave. Resistance point 74 is bounded laterally by resistance leads 76 and 78 which are linear tapers. Resistance point 84 is bounded laterally by resistance leads 86 and 88 which are non linear, concave tapers. A sharpened edge 54 is provided on the series of sections of reduced cross sectional area 62, 72 and 82 and portions of blade 40 between section 62, 72 and 82. Blade 40 would concentrate the heat most intensely at resistance points 64, 74 and 84 and inversely proportional to cross sectional areas of the taper sections 66, 68, 76, 78, 86 and 88. The end portions would have the least amount of heating and the slightly reduced cross sectional area of sections between section 62, 72 and 82 would be less heated than the resistance points.

Further, in addition to heating the blade more evenly, shaping the blade to create resistance points reduces the volume of the blade. This allows the blade to more easily slice through the rubber or other heat sensitive material. As with typical size blades, proper shaping of the blade for purposes of increasing resistance does not weaken the blade. The fact that the blade heats more evenly and cuts through the rubber with less effort, actually makes the blade stronger relative to the force needed to move it through the heat sensitive material. The present invention creates the ability to cut rubber or other heat sensitive materials in ways never before practical. There is a need in this industry to remove rubber but not necessarily in a typical groove shape. Blades for these purposes may be described as specialty blades.

Side cutting where only one leg of a blade is engaged with the rubber or other heat sensitive material is an example of a specialty blade. See FIG. 5C. Another example of a blade designed to reach deeply inside an existing groove and remove rubber as wide as that groove but just from the bottom is shown in FIGS. 6A, 6B and 6C. A third example of a specialty blade is one designed to straddle and slice through an existing slab of rubber or a peninsula or rib. See FIGS. 7A, 7B and 7C.

Figure 5A:
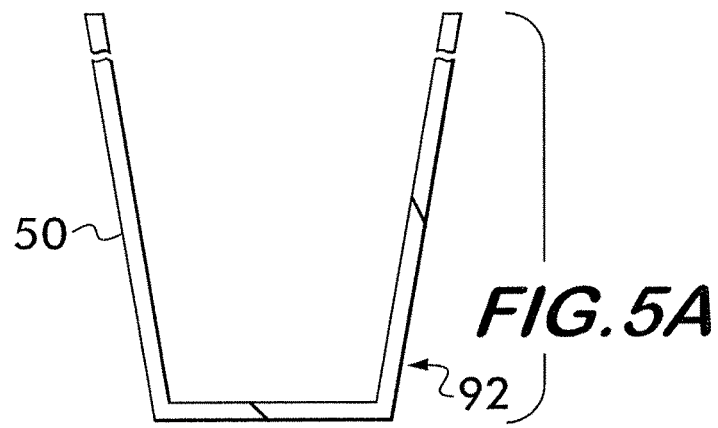
FIG. 5A is an elevation view of another embodiment of a blade in accordance with the present invention having a section of reduced cross sectional area.
Figure 5B:
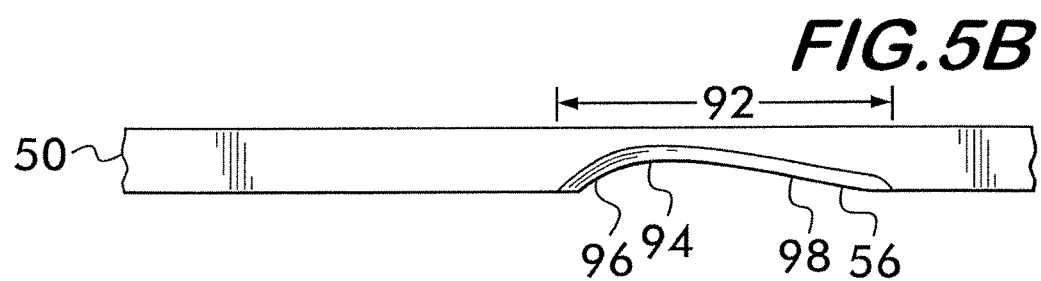
FIG. 5B is a plan view, partially broken away, of the blade of FIG. 5A before bending into the substantially U shape of FIG. 5A which shows the section of reduced cross sectional area with a sharpened edge.
Figure 5C:
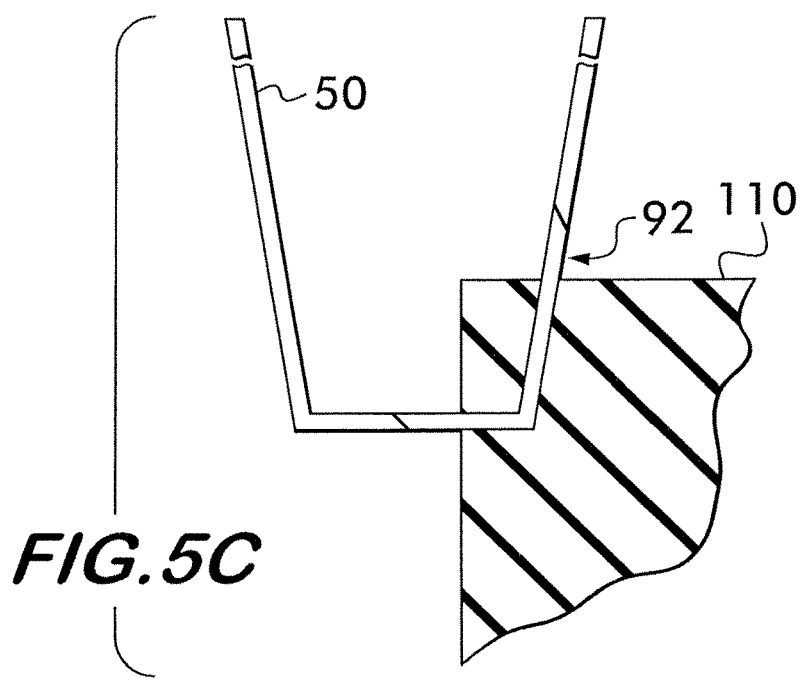
FIG. 5C shows the specialty blade of FIG. 5A utilized for edge cutting a heat sensitive material wherein portions of the blade not within the heat sensitive material will tend not to overheat.
Figure 6A:
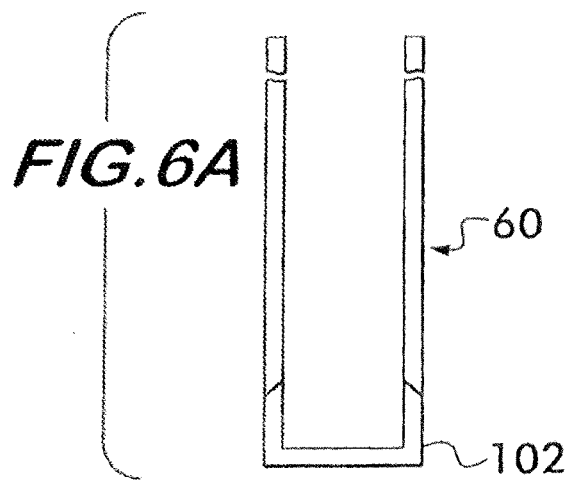
FIG. 6A is an elevation view of another embodiment of a U-shaped blade having a section of reduced cross sectional area.
Figure 6B:
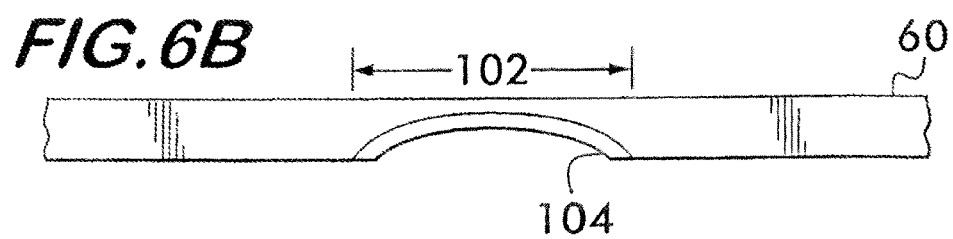
FIG. 6B is a plan view, partially broken away, of the blade of FIG. 6A before being bent.
Figure 6C:
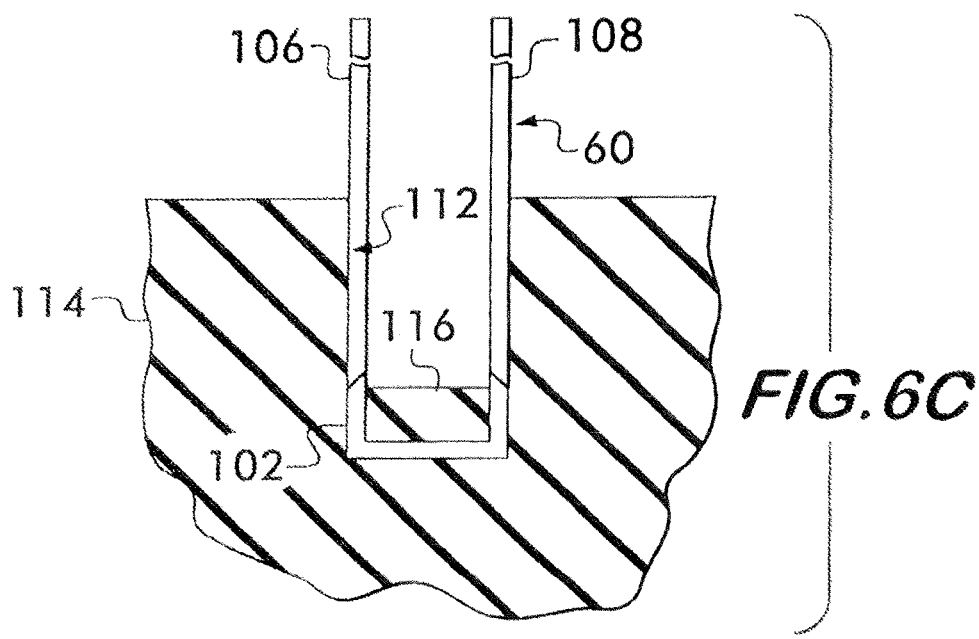
FIG. 6C is a cross sectional view illustrating the blade as shown in FIG. 6A being utilized to deepen an existing groove in heat sensitive material, such as rubber of a tire.

Referring now to FIGS. 5A, 5B and 5C, there is shown a blade 50 which may be used for side cutting a heat sensitive material. FIG. 5B is a plan view of blade 50 before being bent into the shape of FIGS. 5A and 5C, to better illustrate the shaping of the blade with the reduced cross sectional area. Blade 50 is provided with a section 92 of reduced cross sectional area having a resistance point 94 and resistance leads 96 and 98 of non linear concave shape, with resistance lead 98 being longer and less inclined than resistance lead 96. Section 92 has a sharpened edge 56 for cutting.

By shaping the blade properly, a resistance point is created that greatly reduces the electrical current needed to heat the blade and forces the blade to heat at the desired spot. Proper shaping will maintain the strength of the blade. As a result of the present invention, a side cut may be made in heat sensitive material 110 with the majority of the blade being exposed with no overheating. Large or small amounts of heat sensitive material, such as rubber, may be cut away.

Figure 5D:
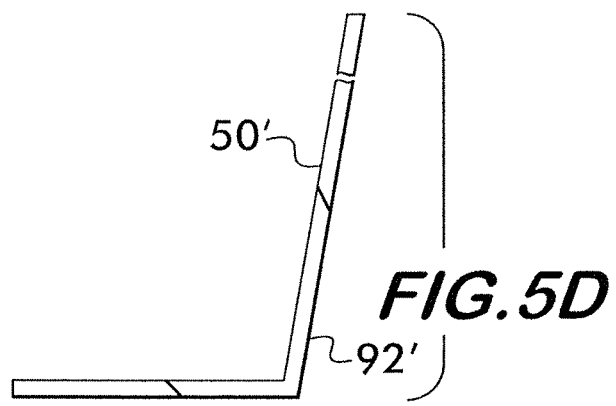
FIG. 5D is an elevation view of another embodiment of a blade in accordance with the present invention having an L shape and a section of reduced cross sectional area.
Figure 5E:
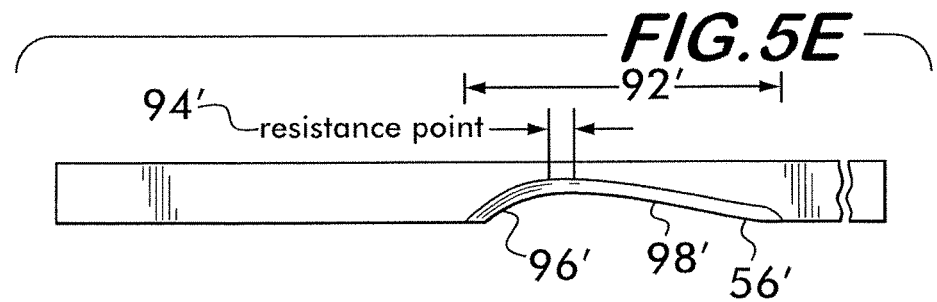
FIG. 5E is a plan view, partially broken away, of the blade of FIG. 5D before bending into the substantially L shape of FIG. 5D which shows the section of reduced cross sectional area with a sharpened edge.
Figure 5F:
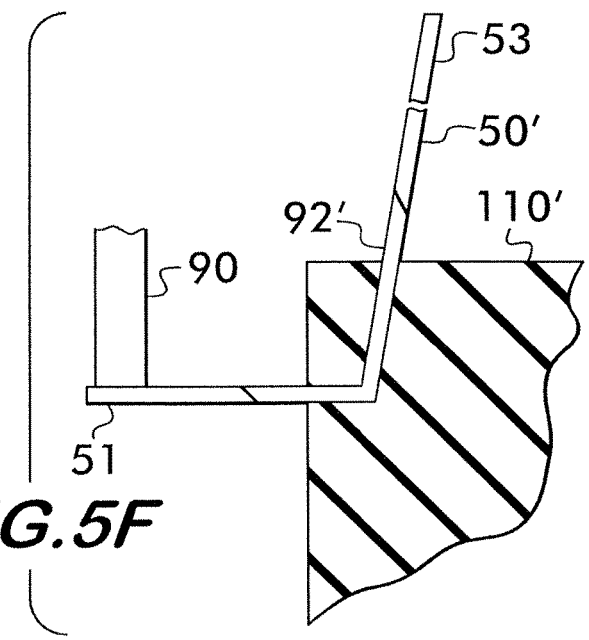
FIG. 5F illustrates the specialty blade of FIG. 5D utilized for edge cutting a heat sensitive material wherein a portion of the blade not within the heat sensitive material will tend not to overheat.

Referring now to FIGS. 5D, 5E and 5F, there is shown an L-shaped blade 50' which is similar to U-shaped blade 50 of FIG. 5A which may be used for side cutting a heat sensitive material. FIG. 5E is a plan view of blade 50' before being bent into the L shape of FIGS. 5D and 5F, to better illustrate the shaping of the blade with the reduced cross sectional area 92'. Blade 50' is provided with a section 92' of reduced cross sectional area having a resistance point 94' and resistance leads 96' and 98' of non linear concave shape, and resistance lead 98' being longer and less inclined than resistance lead 96'. Section 92' has a sharpened edge 56' for cutting. As seen in FIG. 5F, L-shaped blade 50' may be utilized advantageously in cutting heat sensitive material from the side or edge of a heat sensitive material slab 110'. End 51 of L-shaped blade 50' may be connected to an electrical contact 90 by a screw, clamp or other suitable means. End 53 of L-shaped blade 50' may be connected into a slot of a cutting instrument as described hereinafter.

Referring now to FIGS. 6A, 6B and 6C, there is shown a blade 60 which is designed to reach inside an existing groove 112 in a heat sensitive material 114 and deepen it at the same width removing heat sensitive material 116 from the bottom of the groove. The blade 60 is shown in plan view in FIG. 6B wherein the shaping of the blade to produce a section 102 of reduced cross sectional area with a sharpened edge 104. As in the case of all of the blades illustrated, the sharpened edge may be either single bevel or double bevel or any other suitable form of sharpening of the edge. As illustrated in FIG. 6C, section 102 of reduced cross sectional area lies primarily within the heat sensitive material 114, 116 to produce the heating in that area and the legs, 106, 108 of blade 60 remain significantly cooler because they are not of reduced cross sectional area and do not have increased resistance causing increased heating. In other words, reduced cross sectional area of the blade provides much greater electrical resistance and forces the blade to heat at the desired point. The sides or legs 106, 108 of the blade can easily carry the electrical current without overheating.

Referring now to FIGS. 6D, 6E, 6F and 6G, there is shown a blade 60' which is designed for regrooving operations, such as regrooving an existing groove 112' in a heat sensitive material 114'. FIGS. 6F and 6G particularly illustrate how commonly a blade during regrooving operations and particularly the sides of the blade go in and out of the heat sensitive material resulting in overheating particularly of that portion of the blade which extends back to the blade mounting structure. The blade 60' is shown in plan view in FIG. 6E wherein the shaping of the blade to produce a section 102' of reduced cross sectional area with a sharpened edge 104 prime.

As illustrated in FIG. 6F, section 1021 of the blade is perfectly centered on the previous groove 112'. This, if it were able to be perfectly maintained would minimize any overheating. However, as illustrated in FIG. 6G, it is common for the operator to momentarily deviate from perfect centering on the existing groove resulting in portion 61 of the blade being outside of the heat sensitive material with the resulting propensity to overheat. The shaping of the blade results in less heating on the upper ends or blade end portions and reduces the amount of heat carried back to the blade mounting structure. Overheating of the blade mounting structure is detrimental to the blade mounting structure and the unit which holds the blade. By shaping of the blade, the heat is concentrated in the areas of reduced cross sectional area, away from the blade mounting structure.

Referring now to FIGS. 7A, 7B and 7C, there is shown an example of a specialty blade 70 having a section 122 of reduced cross sectional area. Blade 70 is specially adapted to straddle and slice through an existing slab of rubber or other heat sensitive material such as rib or peninsula 126 to remove a portion 128. Section 122 is provided with a sharpened edge 124, which again may be any suitable type of sharpening.

Figure 8A:
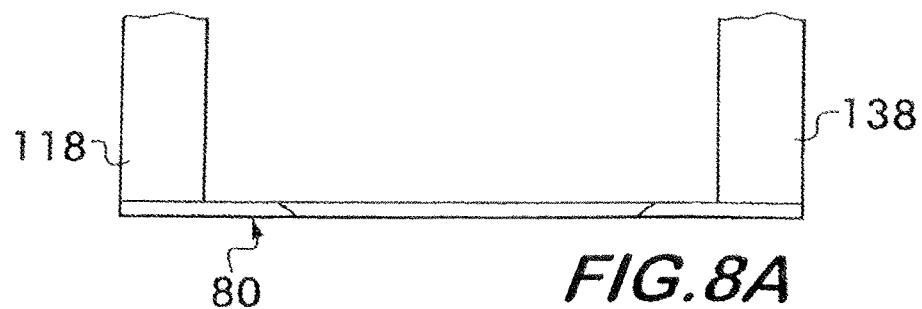
FIG. 8A is an elevation view, partially broken away, of another blade in accordance with the present invention.
Figure 8B:
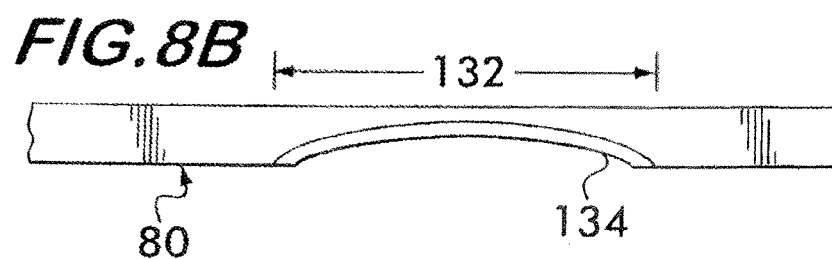
FIG. 8B is a plan view, partially broken away, of the blade of FIG. 8A showing a sharpened section of reduced cross sectional area.
Figure 8C:
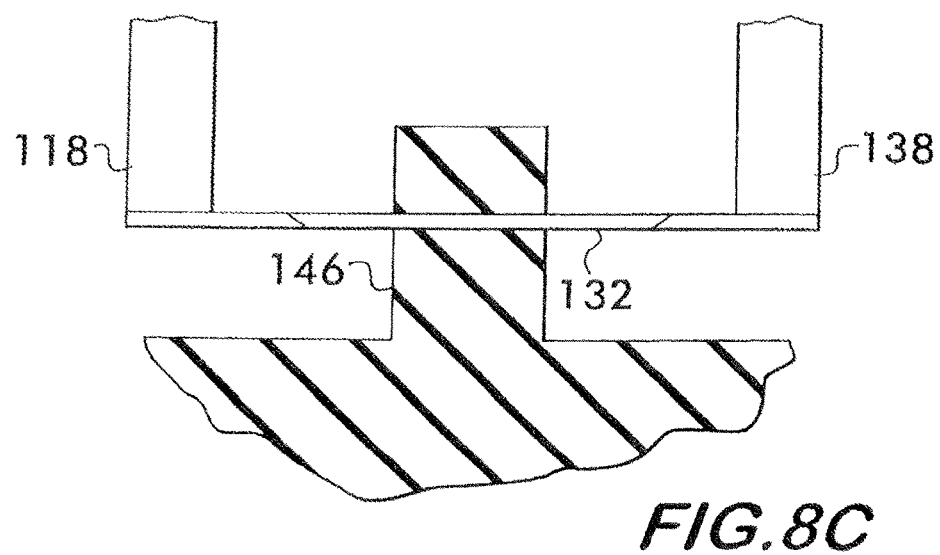
FIG. 8C is a cross sectional view, partially broken away, of the blade of FIG. 8A being utilized to cut through a projecting rib or peninsula of heat sensitive material.

Referring now to FIGS. 8A, 8B and 8C, there is shown a blade 80 in which the body of the blade lies in a single plane, that is, it is not bent into a U shape, but is flat. A straight blade or a blade in a single plane such as blade 80, may be utilized for cutting a rib or peninsula similar to the rib or peninsula in FIG. 7C, or may be utilized for the cutting of various other types of materials including belts and the like. Blade 80 is provided with a section 132 of reduced cross sectional area which provides increased resistance and increased heating. Section 132 is provided with a sharpened edge 134 which may be single bevel, double bevel or any other suitable sharpening form. Blade 80 may be mounted to mounting structures 118 and 138 carrying an electrical current. As illustrated in FIG. 8C, blade 80 may be utilized to cut through a rib or projecting peninsula 146 of heat sensitive material such as rubber or various other shapes.

Referring now to FIGS. 9, 10, 11, and 12 there is shown a hand held unit 100 with its blade mounting structure 120 which includes a power supply 130 for providing electrical current to a substantially U-shaped blade 140 with the power supply 130 being mounted in the hand held unit, which is made possible by the concepts of the present invention. Power supply 130 is controlled by on off switch 142 which receives power via power cord 144 which may carry conventional amounts of current and at a conventional voltage, such as 20 or less amps of current at approximately 120 volts.

Two mirror sections 152 and 154 of the housing of hand held unit 100 may be held together by conventional fasteners such as screws 148. The output current at a low voltage required to adequately heat blade 140 to a temperature suitable for cutting a heat sensitive material such as rubber may be a fraction of the current normally required due to the increased resistance of the reduced cross sectional area of blade 140 as described with respect to the various embodiments of blades described above in connection with FIGS. 1 through 7C, inclusive.

Continuing to refer to FIGS. 9 through 12 and more particularly the exploded view of FIG. 10 and cross sectional views of FIGS. 11 and 12, there is shown a blade mounting structure 120 which includes a pair of contacts such as contact 150 shown in FIG. 11. As is known in the art, the output of an electrical resistance heater for providing electrical heating current to a substantially U shaped blade may be in the form of first and second electrical contacts that are electrically insulated from each other. The blade mounting structures are mounted to these contacts. In this invention, a cradle bracket is mounted to each contact. Cradle brackets 160 and 162 are illustrated with cradle bracket 160 being mounted to contact 150. The cradle brackets may be stamped of brass or the like, or fabricated in any other suitable manner including molding and of any other suitable electrically conductive material. The cradle brackets 160 and 162 are provided with elongated adjusting slots 170 and 172, respectively, for lateral adjustment as will be described hereinafter.

Mounted to cradle brackets 160 and 162 are slotted blade cradles 180 and 182, respectively. Each slotted blade cradle 180 and 182 is provided with a slot 184 and 186, respectively, for receiving a leg or end portion of blade 140. At least one of the slotted blade cradles is laterally adjustable to accommodate blades of various width, and in presently preferred embodiments, both slotted blade cradles are laterally adjustable. As best illustrated with respect to slotted blade cradle 180, the blade cradle 180 is laterally adjustable by loosening a fastener comprised of a hex head bolt 192 and nut 194 and slidably adjusting the position of bolt 192 in elongated adjusting slot 170 of cradle bracket 160. Similar lateral adjustment of slotted cradle bracket 182 may be made by loosening bolt 196, moving slotted blade cradle 182 laterally and then retightening bolt 196 and nut 198. This adjustability provides the ability to use blades of differing width, as indicated by W in FIGS. 12 and 13, to be mounted in the blade mounting structure. Nut 198 is a square nut or any other nut that is not able to rotate. Alternatively, 198 may be an elongated structure with a threaded hole in it, which will not rotate in the channel.

Slotted blade cradles 180 and 182 are provided with guide means for preventing rotational movement of the slotted blade cradle with respect to the cradle bracket. In the embodiment of FIGS. 9 through 12, this guide means may be a lip or projection on the slotted blade cradles as indicated at 190 for slotted blade cradle 180 which engages a lower surface of cradle bracket 160 and rides along the lower surface of cradle bracket 160 during the adjustment process. A similar lip or projection is provided on blade cradle 182 at 200. Other guide means may be utilized including a rectangular projection on the blade cradles which would ride in the elongated adjusting slots on the cradle brackets although the degree of adjustability would be less. Furthermore, the adjustability guide may be a rectangular lip or projection which rides in an adjusting slot as described with respect to the embodiment of FIGS. 13 through 16. As may be appreciated, the mounting structure for each leg of blade 140 is a mirror image of the other.

As may be seen, the legs or end portions 141, 143 of blade 140 are mounted in slots 184, 186 respectively of the slotted blade cradles. The slots in the blade cradles are of sufficient depth to substantially preferably receive the entire blade cross section. As may be appreciated, the slotted blade cradles are mounted directly in contact with the surface of the cradle brackets and are prevented from rotating by the guide means 190, 200 and accordingly, the blades during tightening of the clamp or at any other time are not twisted or rotated to deflect the sides of the blades out of the line of cutting of the cutting tool.

Each side of the mounting structure is provided with a clamp member, 210, 220 formed of a shape to extend over a portion of the slot and a portion of any blade in the slot. As may be best seen in FIGS. 9 and 10, slots 184 and 186 of the slotted blade cradles extend below clamp members 210, 220 allowing visualization of the slots 184, 186 when a new blade is being inserted. Prior art devices require insertion of the ends of the blade into the edge of a slot which is much more difficult to do. In other words, in accordance with the present invention, the blade slots extend below the clamp member and allow easier insertion of a new blade. Each clamp member 210, 220 may be provided with an optional lip 212, 222 respectively. Lips 212 and 222 run along an edge opposite the side of the clamp member which engages the blade. These lips 212, 222 help maintain the clamp level or unslanted with respect to the blade and slotted blade cradles 180 and 182.

Each of the clamp members 210 and 220 are provided with or opposed by a resilient means in the form of springs 214 and 224, respectively. Resilient means 214 and 224 are shown as coil springs mounted at least partially in recesses in slotted blade cradles 180 and 182, respectively, but it is understood that other types of resilient means may be utilized. Springs 214 and 224 maintain clamp members 210 and 220 away from slotted blade cradles 180 and 182, respectively, when their respective fasteners 192 and 196 are loosened for the insertion of a new blade. In accordance with the structure of the present invention, the slotted blade cradles are always kept aligned with the cradle bracket and in alignment for the receiving of a new blade. They are prevented from rotating by guide means or projecting lips 190 and 200 on respective blade cradles 180 and 182. Further, even though the fasteners 192 and 196 may be loosened, the resilient means 214 and 224 maintain the slotted blade cradles against the cradle brackets, with their lips engaged along the lower edges of the cradle brackets preventing rotation of the slotted blade cradles for easy insertion of the blades. Furthermore, the resilient means 214 and 224 maintain the clamp members 210 and 220 in a retracted position allowing easy insertion of a new blade.

Further, the non rotation of the slotted blade cradles in which the legs of the blade are received in slots in the slotted blade cradles prevents any twisting, turning, rotation or other distortion of the legs of the blade with respect to the direction of cutting of the blade during operation.

In accordance with the present invention any suitable means may be utilized for tightening the clamp members 210 and 220 against any blade in the slot of the slotted blade cradles 180, 182 and against a resilient means such as springs 214 and 224 which tend to force the clamp members away from the slotted blade cradles. The means for tightening may include any suitable tightening means and the bolts 192 and 196 and their respective nuts 194 and 198 are merely one example of a tightening means. Further, the resilient means or springs 214 and 224 hold the blade cradle still for putting new blades in the blade cradle when the fasteners such as bolts 192 and 196 and their respective nuts are loosened. Further, as described above, the resilient means may be any suitable spring structure and need not be a coil spring as indicated in a presently preferred embodiment. For example, a leaf spring with a hole through the center for receiving the bolt may work. Further, the components may be made of any suitable conductive material although brass is presently preferred. The parts may be machined, molded or made by other suitable processes.

Further, in accordance with the present invention, blade mounting structure 120 may be provided with stabilizer structures 230 and 232. Stabilizer structures 230, 232 are located on a lower portion of the slotted blade cradles. These may be formed as a unitary part of the slotted blade cradles or they may be elements or pads mounted to the lower portion of the slotted blade cradles, preferably of a low friction material and preferably mounted in a manner in which they may be replaced as they wear. In a presently preferred embodiment, the stabilizer structures 230, 232 are made of a low friction material (material having a lower coefficient of friction than the remainder of the blade mounting structure) such as polytetrafluoroethylene, however, other suitable low friction materials may be utilized. As best illustrated in FIG. 10, at present, stabilizer pad 230 is mounted to the bottom portion of slotted blade cradle 180 by means of a threaded fastener or screw 234. Pad 232 would be mounted to the bottom of slotted blade cradle 182 in a similar manner. Stabilizer structures 230, 232, whether formed as a part of the slotted blade cradle or as a separate pad attached thereto, form a part of the lower end of the blade mounting structure, being attached to the bottom portion of the slotted blade cradle and extending outside of the blade and in front of the blade. In this manner, the stabilizers or stabilizer structure maintains a uniform depth of cut with a sliding motion along the surface of the heat sensitive material being cut by the blade thereby providing a uniform depth of cut, particularly during grooving or regrooving operations of tires, belts or the like. The fact that stabilizer structure, such as stabilizer 230 is mounted to extend in front of the blade may be best seen in FIGS. 9 and 10, as well as the fact that it is mounted to the bottom surface of the slotted blade cradle.

Positioning the stabilizer structure as described, that is outside of the blade and in front of the blade as referenced to the cutting direction increases the users ability to accurately and precisely control the movement of the blade. The stabilizer structure also allows the user to more accurately control the angle and depth of the blade during grooving operations. The stabilizer structure also provides space for the outflow of the heat sensitive material or rubber which is being removed or cut out during a grooving operation. The stabilizer pad may be made of a low friction material (low coefficient of friction material as compared to the blade cradle material) such as polytetrafluoroethylene, which is commercially available under the trademark "TEFLON" from E.I. duPont deNemours and Co. of Wilmington, Del. Use of such a low friction material enhances the ease with which the hand held unit glides over the material being cut.

Figure 15:
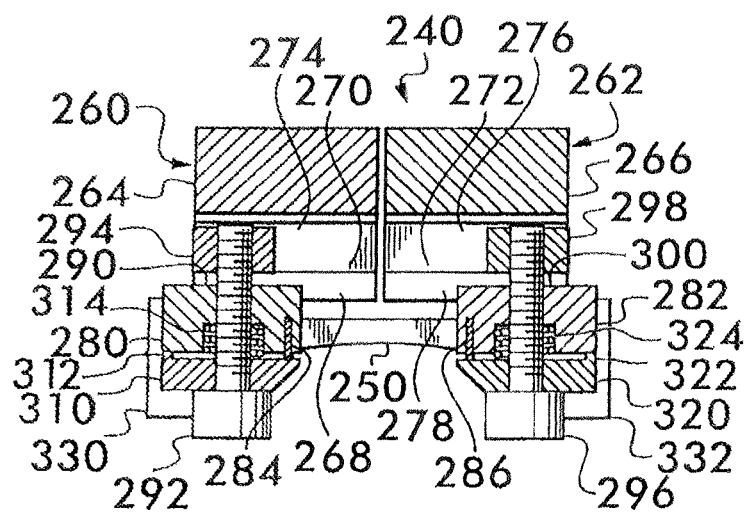
FIG. 15 is a cross sectional view taken along line 15-15 of FIG. 14.
Figure 16:
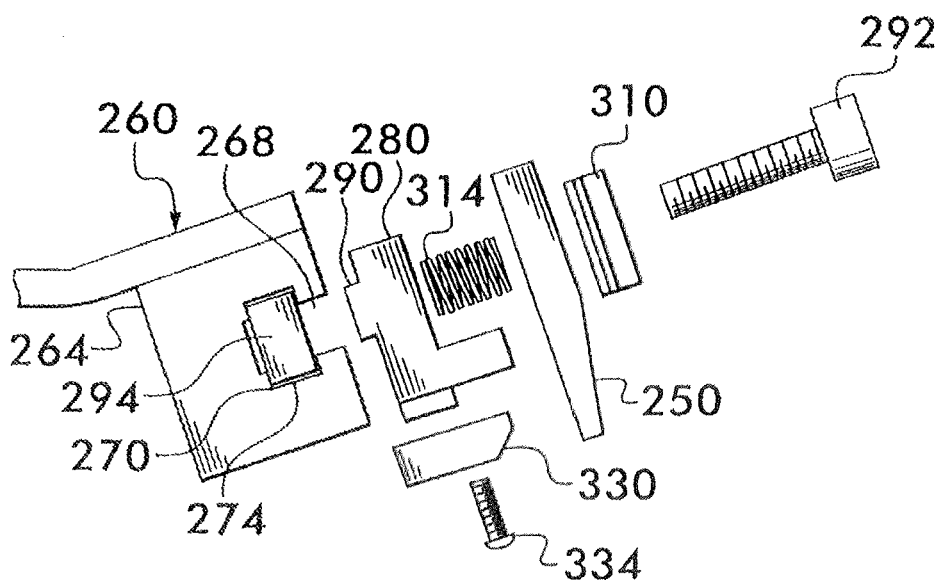
FIG. 16 is an exploded view of the components of one of the blade leg mounting structures of the blade mounting structure of FIG. 13.

Referring now to FIGS. 13, 14, 15 and 16, there is shown another embodiment of a blade mounting structure 240 which is similar to the structure described with respect to FIGS. 9 through 12 with the same advantages, but wherein the cradle bracket includes a block having an elongated T-Slot therein for receiving a nut of the tightening means for lateral adjustment and a rectangular projection on the blade cradle which rides in the stem channel of the T-channel block preventing rotation of the slotted blade cradle with respect to the cradle bracket. Cradle brackets 260 and 262 include as a part thereof, either formed integrally or mounted thereto blocks 264, and 266, respectively, each having an elongated T-Slot therein. Each of the blocks 264 and 266 have a T-channel 270 and 272, respectively. Each T-channel is comprised of a top section of the T 274, 276 and a stem section of the T 268 and 278. A nut or other threaded fastening means 294 and 298 are retained in the top sections of the T-channel 274 and 276, respectively. Nuts 294 and 298 receive threaded fasteners or hex head bolts 292 and 296, respectively. It is understood that nuts 294 and 298 may be replaced by various other types of structure including any type of an elongated structure which would ride in the top section of the channel and have a threaded hole therein for receiving a threaded fastener such as a bolt. When bolts 292 and 296 are tightened, the nut is drawn tightly against the forward wall of the T-channel securing the slotted blade cradles 280 and 282 in place. Slotted blade cradles 280 and 282 are provided with slots 284 and 286, respectively, similar to the embodiment of FIGS. 9 through 12, for receiving the legs of blade 250. As may be best seen in FIG. 13 slots 284, 286 of slotted blade cradles 280, 282 extend below clamp members 310, 320 allowing visualization of the slots for easy insertion of the upper end portions of the blade. That is, as described previously with respect to FIGS. 9 and 10, the very ends of the blade do not have to be inserted end wise into the bottom edge of the slot. This makes blade insertion much more easily done, particularly when the slotted blade cradles and their respective slots are held immobile by means of the resilient means in the form of a spring and their respective guide means. The backside of slotted blade cradles 280 and 282 are provided with a guide means for preventing rotational movement of the slotted blade cradle with respect to the cradle bracket in the form of rectangular projections or lips 290 and 300, respectively. It is understood that a square is a form of a rectangle. However, in a presently preferred embodiment, as is best illustrated in FIG. 15, the guide means in the form of rectangular projections or lips 290 and 300 run the entire width of the backside of slotted blade cradles 280 and 282. The guide 290 on slotted blade cradle 280 is illustrated in FIG. 16, which is an exploded view of the components of one side of the blade mounting structure as viewed taken substantially along line 14-14 of FIG. 13.

As described with respect to the previous embodiment, slotted blade cradles 280 and 282 are provided with clamp members 310 and 320 which are tightened by fasteners 292 and 296 against resilient means such as springs 314 and 324. Clamp members 310 and 320 are provided with lips or projections 312 and 322, respectively, which tend to maintain the clamp members parallel to the surface of the slotted blade cradles and perpendicular to the edge of the legs of blade 250.

Similar to the blade installation and adjustment features of the embodiment described with respect to FIGS. 9 through 12, a new blade may be inserted by loosening fasteners 292 and 296, allowing clamp members 310 and 320 to retract as forced back by resilient members or springs 314 and 324 enabling easy width (W of FIG. 13) adjustment by slidably moving the fasteners 292 and 296 in T channels 270 and 272, respectively, and easily inserting a new blade 250 in the slots of the slotted blade cradles as the slotted blade cradles are kept in alignment by the guide means 290 and 300 which are retained in the stems of T-channels by the resilient forces of the springs. The slots are also open and readily available for receiving the legs of a blade since the clamp members 310 and 320 are held away from the slotted blade cradles by springs 314 and 324, respectively.

As described with respect to the previous embodiment, the embodiment of FIGS. 13 through 16 is also provided it with stabilizer structures 330 and 332. The stabilizer structure may be formed as a part of the lower part of the slotted blade cradle or removably attachable to the bottom portion of the slotted blade cradle as described with respect to the other embodiment. These stabilizer structures may be preferably made of a low coefficient of friction material such as polytetrafluoroethylene or other suitable materials as described the above. In the case of a removable stabilizer structure, the stabilizer may be held to the bottom of slotted blade cradle by a screw, such as for example screw 334 illustrated in FIGS. 14 and 16, or by other suitable releasable securing means.

It will be understood that various changes and modifications may be made to the concepts of the present invention and still fall within the scope of the present invention. For example, various shapes of guide means may be placed on the slotted blade cradle or on the cradle bracket. For example, the projection may be on the cradle bracket, with mating slots in the blade cradle, as contrasted to being on the slotted blade cradle. Various types of fasteners may be utilized. Various spring structures may be utilized to provide a resilient means to hold the clamp member away from the slotted blade cradle and to keep the cradle still or immobilized when the fastener is loosened. Various other structures may be utilized to mount the slotted blade cradles to the contacts. The taper section or resistance lead section of the blade may be discontinuous, that is in other words, the blade may instantly change from one cross sectional area to another cross sectional area. In other words, the rate of taper could be very high, even approaching infinity.

The present invention may be embodied in other specific forms without departing from the spirit or essential attributes thereof and, accordingly, reference should be made to the appended claims, rather than to the foregoing specification as indicating the scope of the invention.

I claim:

1. A blade mounting structure for a blade, comprising:
    a pair of contacts;
    a pair of cradle brackets, one respectively mounted to each contact of said pair of contacts, wherein for each said cradle bracket:
        a slotted blade cradle having a slot therein for receiving a portion of a blade, wherein said slotted blade cradle is mounted to said cradle bracket and laterally adjustable with respect to said cradle bracket so that blades of differing width may have a portion of the blade inserted into said slot;
        a guide means for said slotted blade cradle for preventing rotational movement of said slotted blade cradle with respect to said cradle bracket;
        a clamp member for said slotted blade cradle, said clamp member formed of a shape to extend over a portion of said slot in said blade cradle and any blade in the slot, said clamp member being without a slot; and
        a fastener for tightening said clamp member against a portion of any blade in said slot, said fastener further substantially simultaneously clamping said slotted blade cradle against said cradle bracket for preventing movement of the slotted blade cradle with respect to said cradle bracket.

2. A blade mounting structure in accordance with claim 1 wherein said slotted blade cradle is provided with said guide means to maintain said slotted blade cradle in alignment with said cradle bracket.

3. A blade mounting structure in accordance with claim 1 wherein said cradle bracket is provided with an elongated slot for receiving said fastener for lateral adjustment.

4. A blade mounting structure in accordance with claim 1 wherein said cradle bracket includes a block having an elongated T-slot therein; and a nut of said fastener being received in said elongated T-slot for lateral adjustment.

5. A blade mounting structure in accordance with claim 4 including: a resilient means mounted between each said slotted blade cradle and its said clamp member; said resilient means causing said nut of a fastener to be maintained against an inner surface of said T-slot while maintaining said clamp away from said blade cradle such that the blade cradle with the clamp is stable even though said fastener is loosened.

6. A blade mounting structure in accordance with claim 4 wherein said guide means is in the form of a rectangular projection on said slotted blade cradle riding at least partially in said elongated T-slot formed in said block.

7. A blade mounting structure in accordance with claim 1 including a stabilizer structure.

8. A blade mounting structure in accordance with claim 7 wherein said slotted blade cradle further comprises a stabilizer structure having a portion of the stabilizer structure extending to the outside of said blade slots and in front of said blade slots.

9. A blade mounting structure in accordance with claim 1 wherein said slot in said slotted blade cradle extends below said clamp member enabling full view insertion of a portion of a blade into said slot.

10. A blade mounting structure for an electrical resistance heated blade, comprising:
    a pair of electrical contacts;
    a pair of cradle brackets, one respectively mounted to each of said pair of contacts, wherein for each said cradle bracket:
        a slotted blade cradle having a slot therein for receiving a portion of a blade, wherein said slotted blade cradle is mounted to said cradle bracket and laterally adjustable with respect to said cradle bracket so that blades of differing width may have a portion of the blade inserted into said slot;
        a guide means for preventing rotational movement of said slotted blade cradle with respect to said cradle bracket to which it is mounted;
        a clamp member for said slotted blade cradle, said clamp member formed of a shape to extend over a portion of said slot and any blade in the slot;
        a single fastener for tightening said clamp member against any blade in said slot, said single fastener further substantially simultaneously clamping said slotted blade cradle against said cradle bracket for preventing movement of the slotted blade cradle with respect to said cradle bracket; and
        a stabilizer structure on a lower portion of said slotted blade cradle.

11. A blade mounting structure in accordance with claim 10 wherein said slotted blade cradle is provided with said guide means to maintain said slotted blade cradle in alignment with said cradle bracket.

12. A blade mounting structure in accordance with claim 10 wherein said cradle bracket has an elongated slot for receiving said single fastener for lateral adjustment.

13. A blade mounting structure in accordance with claim 10 wherein said cradle bracket includes a block having an elongated T-slot therein for receiving a nut of said fastener for lateral adjustment.

14. A blade mounting structure in accordance with claim 13 wherein said guide means is in the form of a rectangular projection on said slotted blade cradle riding at least partially in said elongated T-slot formed in said block.

15. A blade mounting structure in accordance with claim 10 wherein a portion of the stabilizer structure extends to the outside of said blade slots and in front of said blade slots.

16. A blade mounting structure in accordance with claim 15 wherein said stabilizer structure is formed of a material having a lower coefficient of friction than said slotted blade cradle.

17. A blade mounting structure in accordance with claim 16 wherein said lower coefficient of friction material is polytetrafluoroethylene.

18. A blade mounting structure in accordance with claim 10 wherein said slot in said slotted blade cradle extends below said clamp member enabling full view insertion of a blade into said slot.

19. A blade mounting structure for an electrical resistance heated substantially U-shaped blade, comprising:
a pair of electrical contacts;
a pair of cradle brackets, one respectively mounted to each of said pair of contacts, wherein for each said cradle bracket:
a slotted blade cradle having a slot therein, wherein said slotted blade cradle is mounted to said cradle bracket and laterally adjustable with respect to said cradle bracket so that blades of differing width may have a leg of the blade inserted into said slot;
a guide means for preventing rotational movement of said slotted blade cradle with respect to said cradle bracket to which it is mounted;
a clamp member for said slotted blade cradle, said clamp member formed of a shape to extend over a portion of said slot and any blade in the slot;
a resilient means mounted between said slotted blade cradle and said clamp member;
means for tightening said clamp member against any blade in said slot and against said resilient means tending to force said clamp member away from said slotted blade cradle, said means for tightening further substantially simultaneously clamping said slotted blade cradle against said cradle bracket for preventing movement of the slotted blade cradle with respect to said cradle bracket; and
a stabilizer structure on a lower portion of said slotted blade cradle.

20. A blade mounting structure in accordance with claim 19 wherein said slotted blade cradle is provided with said guide means to maintain said slotted blade cradle in alignment with said cradle bracket.

21. A blade mounting structure in accordance with claim 20 wherein said guide means is in the form of a rectangular projection on said slotted blade cradle riding at least partially in said elongated T-slot formed in said block.

22. A blade mounting structure in accordance with claim 19 wherein said cradle bracket is formed to have an elongated slot for receiving said tightening means for lateral adjustment.

23. A blade mounting structure in accordance with claim 19 wherein said cradle bracket includes: a block having an elongated T-slot therein for receiving a nut of said tightening means for lateral adjustment.

24. A blade mounting structure in accordance with claim 19 wherein a portion of the stabilizer structure extends to the outside of said blade slots and in front of said blade slots.

25. A blade mounting structure in accordance with claim 19 wherein said stabilizer structure is formed of a material having a lower coefficient of friction than said slotted blade cradle.

26. A blade mounting structure in accordance with claim 25 wherein said lower coefficient of friction material is polytetrafluoroethylene.

27. A blade mounting structure in accordance with claim 19 wherein said slot in said slotted blade cradle extends below said clamp member enabling full view insertion of a blade into said slot.

28. A blade mounting structure for a substantially U-shaped blade, comprising:
a pair of contacts;
a pair of cradle brackets, one respectively mounted to each contact of said pair of contacts, wherein for each said cradle bracket:
a slotted blade cradle having a slot therein, wherein said slotted blade cradle is mounted to said cradle bracket and laterally adjustable with respect to said cradle bracket so that blades of differing width may have a leg of the blade inserted into said slot;
a guide means for said slotted blade cradle for preventing rotational movement of said slotted blade cradle with respect to said cradle bracket;
a clamp member for said slotted blade cradle, said clamp member formed of a shape to extend over a portion of said slot and any blade in the slot;
a resilient means mounted between said slotted blade cradle and said clamp member tending to force apart said clamp member and said slotted blade cradle and tending to force each said blade cradle, said guide means and said cradle bracket together; and
means for tightening said clamp member against a portion of any blade in said slot and against said resilient means, said means for tightening further substantially simultaneously clamping said slotted blade cradle against said cradle bracket for preventing movement of the slotted blade cradle with respect to its cradle bracket;
wherein said resilient means, upon loosening of said tightening means, enables sliding adjustment of said slotted blade cradle with respect to said cradle bracket and separation of said clamp member from said slotted blade cradle for insertion of a leg of a blade.

29. A blade mounting structure in accordance with claim 28 wherein said slotted blade cradle is provided with said guide means to maintain said slotted blade cradle in alignment with said cradle bracket.

30. A blade mounting structure in accordance with claim 28 wherein said cradle bracket is formed of a stamped metal having an elongated slot for receiving said tightening means for lateral adjustment.

31. A blade mounting structure in accordance with claim 28 wherein said cradle bracket includes a block having an elongated T-slot therein for receiving a nut of said tightening means for lateral adjustment.

32. A blade mounting structure in accordance with claim 31 wherein said resilient means causes said nut of said tightening means to be maintained against an inner surface of said T-slot while maintaining said clamp away from said blade cradle such that the blade cradle with the clamp is stable even though said tightening means is loosened.

33. A blade mounting structure in accordance with claim 31 wherein said guide means is in the form of a rectangular projection on said slotted blade cradle riding at least partially in said elongated T-slot formed in said block.

34. A blade mounting structure in accordance with claim 28 including: a stabilizer structure.

35. A blade mounting structure in accordance with claim 34 wherein said stabilizer structure is formed as a part of the lower end of said slotted blade cradle by a portion extending to the outside of said blade slots and in front of said blade slots.

36. A blade mounting structure in accordance with claim 28 wherein said slot in said slotted blade cradle extends below said clamp member enabling full view insertion of a blade into said slot.

37. A blade mounting structure in accordance with claim 28 wherein said means for tightening said clamp member and for substantially simultaneously clamping said slotted blade cradle against said cradle bracket is a single threaded fastener.

38. A blade mounting structure in accordance with claim 37 wherein said single threaded fastener is provided with a nut, said nut of said threaded fastener riding in an elongated channel in said cradle bracket, enabling lateral adjustment of said slotted blade cradle with respect to said cradle bracket.

* * * * *